United States Patent
Devarajan et al.

(10) Patent No.: US 9,917,766 B2
(45) Date of Patent: Mar. 13, 2018

(54) LOOP-FREE HYBRID NETWORK

(71) Applicant: Hewlett-Packard Development Company, L.P., Houston, TX (US)

(72) Inventors: Venkatavaradhan Devarajan, Bangalore (IN); Ram Prasad Allu Ram, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 214 days.

(21) Appl. No.: 14/777,436

(22) PCT Filed: Jun. 14, 2013

(86) PCT No.: PCT/US2013/045869
§ 371 (c)(1),
(2) Date: Sep. 15, 2015

(87) PCT Pub. No.: WO2014/143118
PCT Pub. Date: Sep. 18, 2014

(65) Prior Publication Data
US 2016/0036644 A1    Feb. 4, 2016

(30) Foreign Application Priority Data
Mar. 15, 2013  (IN) .............................. 771/DEL/2013

(51) Int. Cl.
*H04L 12/709* (2013.01)
*H04L 12/46* (2006.01)
*H04L 12/24* (2006.01)

(52) U.S. Cl.
CPC ............ *H04L 45/245* (2013.01); *H04L 12/46* (2013.01); *H04L 12/462* (2013.01); *H04L 41/12* (2013.01); *Y02B 60/43* (2013.01); *Y02D 30/30* (2018.01)

(58) Field of Classification Search
CPC ..................................................... H04L 45/245
See application file for complete search history.

(56) References Cited

U.S. PATENT DOCUMENTS

| 5,889,846 A | 3/1999 | Ricciardi | |
| 2007/0008949 A1* | 1/2007 | Balandin | H04L 45/02 370/351 |

(Continued)

FOREIGN PATENT DOCUMENTS

| CN | 101582902 | 11/2009 |
| CN | 101964746 | 2/2011 |

(Continued)

OTHER PUBLICATIONS

"OpenFlow Switch Specification," Dec. 31, 2009, pp. 1-42, Version 1.0.0 (Wire Protocol 0x01).

(Continued)

*Primary Examiner* — Jason E Mattis
(74) *Attorney, Agent, or Firm* — Hewlett Packard Enterprise Patent Department

(57) ABSTRACT

A loop-free hybrid network can include receiving an advertisement from a non-software defined network (SDN) network device, determining a network topology that includes the non-SDN network device and a number of SDN network devices, and sending an aggregating instruction to the non-SDN network device, wherein the aggregating instruction aggregates all connections between the non-SDN network device and the number of SDN network devices.

20 Claims, 5 Drawing Sheets

(56) References Cited

U.S. PATENT DOCUMENTS

| | | | |
|---|---|---|---|
| 2008/0285548 A1 | 11/2008 | Kittredge et al. | |
| 2010/0014431 A1 | 1/2010 | Bajpay et al. | |
| 2012/0102228 A1* | 4/2012 | Cugini | H04L 45/04 709/242 |
| 2012/0155467 A1 | 6/2012 | Appenzeller | |
| 2012/0185856 A1 | 7/2012 | Ashihara et al. | |
| 2012/0230344 A1 | 9/2012 | Haddock | |
| 2013/0010600 A1 | 1/2013 | Jocha et al. | |
| 2013/0028070 A1 | 1/2013 | Beheshti-Zavareh et al. | |
| 2013/0194914 A1* | 8/2013 | Agarwal | H04L 45/245 370/225 |
| 2013/0250770 A1* | 9/2013 | Zou | H04L 47/19 370/238 |
| 2014/0207967 A1* | 7/2014 | Bryskin | H04L 45/02 709/243 |
| 2014/0215027 A1* | 7/2014 | Janardhanan | H04L 41/0803 709/220 |
| 2015/0249587 A1* | 9/2015 | Kozat | H04L 43/10 370/222 |

FOREIGN PATENT DOCUMENTS

| | | |
|---|---|---|
| JP | 2013-030863 A | 2/2013 |
| KR | 2012-0055955 A | 6/2012 |

OTHER PUBLICATIONS

"OpenFlow Switch Specification," Feb. 28, 2011, pp. 1-56, Version 1.1.0 Implemented (Wire Protocol 0×02).

International Search Report and Written Opinion, International Application No. PCT/US2013/045869, dated Dec. 19, 2013, pp. 1-10.

Nick McKeown et al.., "OpenFlow: Enabling Innovation in Campus Networks," Mar. 14, 2008, pp. 1-6.

Pavle Vujosevic et al., "Investigation and validation of the OpenFlow protocol for next generation converged optical networks," Master Thesis Report, Barcelona School of Telecommunication Engineering, Jul. 2011, pp. 1-100.

Alcatel-Lucent, "Hybrid OpenFlow Switch," Dec. 31, 2012, pp. 1-10.

Christian E. Rothenberg et al., "Revisiting Routing Control Platforms with the Eyes and Muscles of Software-Defined Networking," 2012, pp. 13-18, ACM.

Extended European Search Report, EP Application No. 13877926.9, dated Feb. 21, 2017, pp. 1-13, EPO.

Fernando N. N. Farias et al., "A Proposal Management of the Legacy Network Environment using OpenFlow Control Plane," 2012, pp. 1143-1150, IEEE.

Seokhwan Kong and Suengyong Park, "Virtual Network Management through Hybrid Software Defined Network (HSDN) Platform," IEICE Transactions on Communications, Jan. 2013, pp. 65-68, vol. E96B, No. 1.

* cited by examiner

LOOP-FREE HYBRID NETWORK

CROSS-REFERENCE TO RELATED APPLICATION

This application is a national stage application under 35 U.S.C. § 371 of PCT/US2013/045869, filed Jun. 14, 2013, which claims priority to Indian Application No. 771/DEL/2013, filed Mar. 15, 2013.

BACKGROUND

A data plane loop can be caused when data is continuously transferred within a network without being transferred to a particular destination (e.g., end point). For example, forwarding rules assigned to network devices (e.g., routers, switches) can be conflicting (e.g., incorrect). That is, forwarding rules can send units (e.g., frames, packets) within a number of network switches without transferring the data units to a particular destination. A data plane loop can consume network resources (e.g., bandwidth) by continuously transferring data units among network devices within the network.

DETAILED DESCRIPTION

A network can include a variety of network devices with varying capabilities (e.g., receiving software instructions, communicating with a network controller, etc.). A loop-free hybrid network can be created utilizing a number of software defined network (SDN) network devices (e.g., network devices capable of receiving software instructions such as forwarding rules from the network controller) and a number of non-SDN network devices (e.g., network devices unable to receive software instructions from the network controller).

The number of SDN network devices can be connected on a first layer of the network and the non-SDN network devices can be connected to the SDN network devices on a second layer of the network. By aggregating the ports of the non-SDN network devices as described herein, a loop-free hybrid network can be created.

In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

As used herein, "a" or "a number of" something can refer to one or more such things. For example, "a number of network devices" can refer to one or more network devices.

Figure 1:
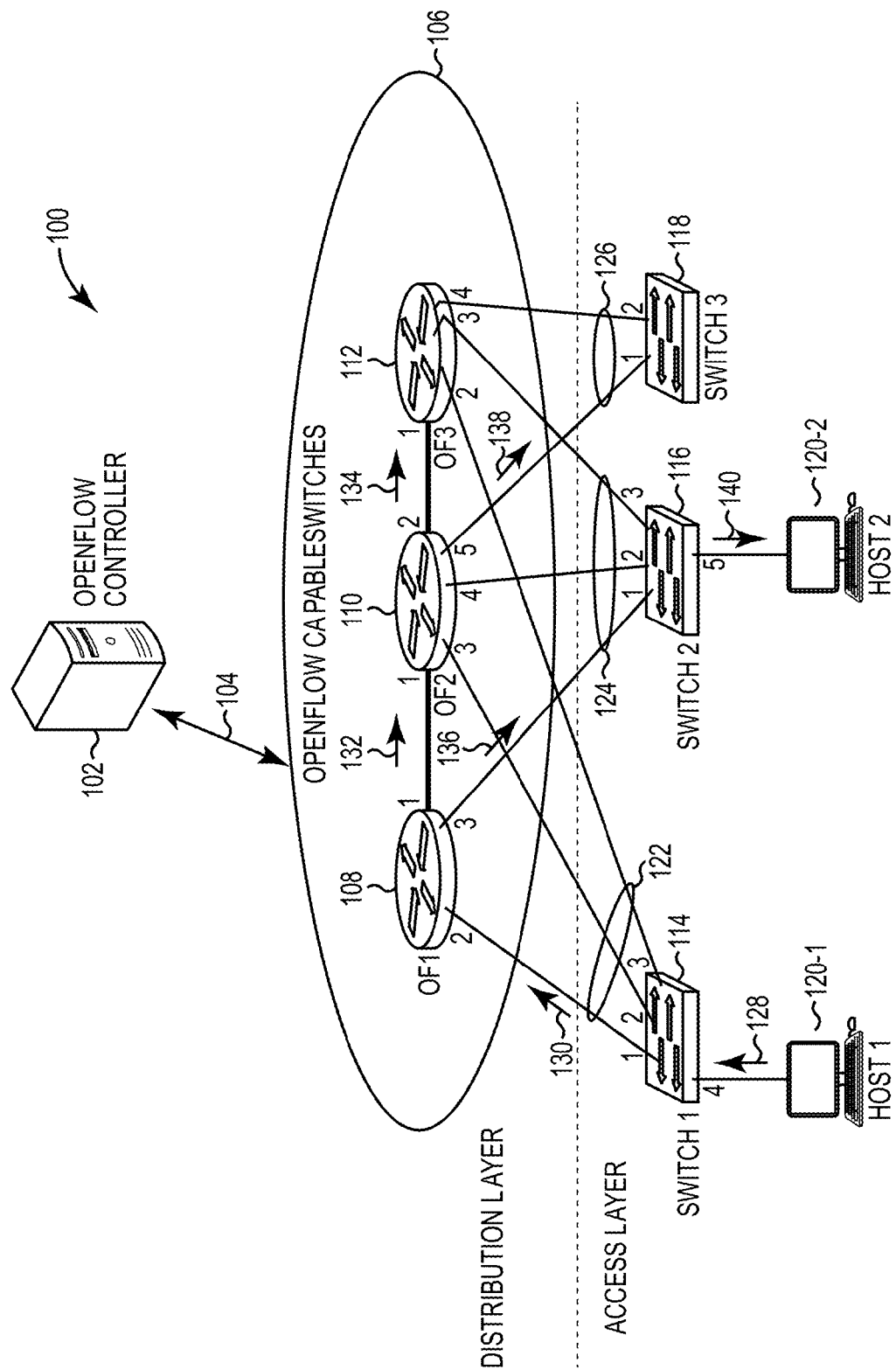
FIG. 1 illustrates a diagram of an example of a loop-free hybrid network according to the present disclosure.

FIG. 1 illustrates a diagram of an example of a loop-free hybrid network 100 according to the present disclosure. The loop free network 100 can include a network controller 102. The network controller 102 can control a number of forwarding rules (e.g., instructions to direct a network device on what port to forward a data unit) for a number of SDN network devices (e.g., switch (OF1) 108, switch (OF2) 110, switch (OF3) 112).

The number of SDN network devices can be network devices (e.g., switches, routers, etc.) that are capable of receiving software instructions in the form of forwarding rules from the network controller 102. For example, the network controller 102 can be a network controller that utilizes communications protocol such as Open Flow to communicate forwarding rules to each of the number of SDN network devices. The forwarding rules can include instructions (e.g., computer readable instructions) sent to a first software defined network device for forwarding received data units to a different computing device (e.g., software defined network device, non-software defined network device, host computing device, etc.). For example, switch (OF1) 108 can receive a forwarding rule from the network controller 102 that includes sending a received data unit with a destination address of host (2) 120-2 out of port 3 to port 1 of switch (2) 116.

There can be a number of different forwarding rules sent to each of the number of SDN network devices. Each of the number of forwarding rules can correspond to a particular source address (e.g., source identifier, source media access control (MAC) address) and/or a particular destination address (e.g., destination identifier, destination media access control (MAC) address) of the received data unit. The source address and destination address can be included within a header of the data units.

Each of the number SDN network devices can determine the source address and destination address by analyzing a received data unit header. When the software defined network device determines the source address and destination address, the software defined network device can determine an out-port to send the received data unit utilizing a forwarding rule defined by the network controller 102.

The loop free network 100 can include a number of non-SDN network devices (e.g., switch (1) 114, switch (2) 116, switch (3) 118). The non-SDN network devices can be network devices (e.g., switches, routers, etc.) that are not capable of receiving forwarding instructions from the network controller 102. The non-SDN network devices can include predefined forwarding rules utilizing hardware and/or logic to forward data units.

The number of SDN network devices can be connected on a different layer (e.g., level) as the number of non-SDN network devices. For example, the number of SDN network devices can be connected to a number of other SDN network devices on a first layer (e.g., distribution layer) and to the number of non-SDN network devices can be connected on a second layer (e.g., access layer). For example, the distribution layer can include switch (OF2) 110 connected to switch (OF1) 108 and switch (OF3) 112. Each of the number of SDN network devices can be connected to a number of non-SDN network devices. For example, switch (OF1) 108 can be connected to switch (1) 114, switch (2) 116, and switch (3) 118. Within the loop free network 100 the number of SDN network devices may not be directly connected to a number of host computing devices (e.g., host (1) 120-1, host (2) 120-2). That is, there can be a network device that receives a data unit from a host computing device and the network device can forward the data unit to the number of SDN network devices.

The number of non-SDN network devices can be connected to the number of SDN network devices. For example, switch (1) 114 can be connected to switch (OF1) 108, switch (OF2) 110, and switch (OF3) 112. The number of non-SDN network devices may not be connected to other non-SDN network devices. Not coupling the non-SDN network devices to other non-SDN network devices on the access layer can ensure that data units are forwarded to at least one software defined network device. For example, a data unit sent from host (1) 120-1 to port 4 of switch (1) 114 would be sent to one of the SDN network devices on the distribution layer when the data unit is being sent to host (2) 120-2.

Ensuring that data units are forwarded to at least one software defined network device can enable the network controller 102 to generate a forwarding rule set for all data units being transferred within the loop-free hybrid network 100. As described herein, the SDN network devices can receive forwarding rules for forwarding data units. That is, even if the source address and/or destination address for a particular data unit is new to the loop-free hybrid network (e.g., forwarding rule not included within an existing forwarding table), the number of SDN network devices can communicate with the network controller 102 and receive a forwarding rule for the data unit.

The ports on the non-SDN network devices that connect the non-SDN network devices to the SDN network devices can be aggregated (e.g., link aggregation). Aggregating the ports on the non-SDN network devices can combine the multiple connections between the non-SDN network devices and the SDN network devices into a single connection between a non-software defined network device and the SDN network devices. For example, port 1, port 2, and port 3 on switch (1) 114 can be aggregated at 122. In this example, switch (1) 114 can be limited to sending data units to a single software defined network device (e.g., switch (OF1) 108).

Aggregating the ports on the non-SDN network devices can eliminate sending a copy of a particular data unit to each of the connected SDN network devices when broadcasting (e.g., sending a data unit to all devices connected to the network) the particular data. In addition, aggregating the ports on the non-SDN network devices can eliminate receiving multiple copies of the particular data from the SDN network devices when broadcasting the particular data. In contrast, without aggregating the ports on the non-SDN network devices, a single data unit would be sent to each of the SDN network devices that are connected to a port on the non-SDN network devices. Not aggregating the ports on the non-SDN network devices can result in multiple copies of the single data unit being sent to multiple SDN network devices and each software defined network device could implement a particular forwarding rule that could generate data plane loops and/or send multiple copies to a destination device.

Sending multiple copies of a single data unit to a particular network device can be prevented by aggregating the ports on the non-SDN network devices as described herein. In an example, host (1) 120-1 can attempt to broadcast a data unit. In this example, the data unit can be forwarded to port 4 of switch (1) 114 via path 128. The switch (1) 114 can be aggregated at 122 as described herein and send the data unit out of a single aggregated port at port 1 to port 2 of switch (OF1) 108 via path 130. When switch (1) 114 is aggregated only a single copy of the data unit will be sent from switch (1) 114 to one of the number of SDN network devices. That is, the switch (1) 114 can be configured to send a single copy to one of switch (OF1) 108, switch (OF2) 110, or switch (OF3) 112.

In the same example, switch (OF1) 108 can broadcast the data unit from port 3 to port 1 of switch (2) 116. The ports (e.g., port 1, port 2, port 3) of switch (2) 116 can be aggregated at 124 similarly to switch (1) 114. That is, switch (2) 116 can receive the data unit from a single designated port. The switch (OF1) 108 can also broadcast the data unit from port 1 to port 1 of (OF2) 110.

Switch (OF2) 110 can broadcast the data unit from port 2 to port 1 of switch (OF3) 112. The switch (OF2) 110 can also broadcast the data unit from port 5 to port 1 of switch (3) 118. The ports of switch (3) 118 can be aggregated at 126 to receive the data unit from a single designated port. In the same example, switch (2) 116 can send the data unit to host (2) 120-2 via path 140.

The loop-free hybrid network 100 can ensure that data plane loops are avoided while utilizing SDN network devices and non-SDN network devices. Utilizing the described distribution layer and access layer for each of the number of network devices and aggregating the ports of the non-SDN network devices can provide a loop-free hybrid network even when broadcasting data units.

Figure 2:
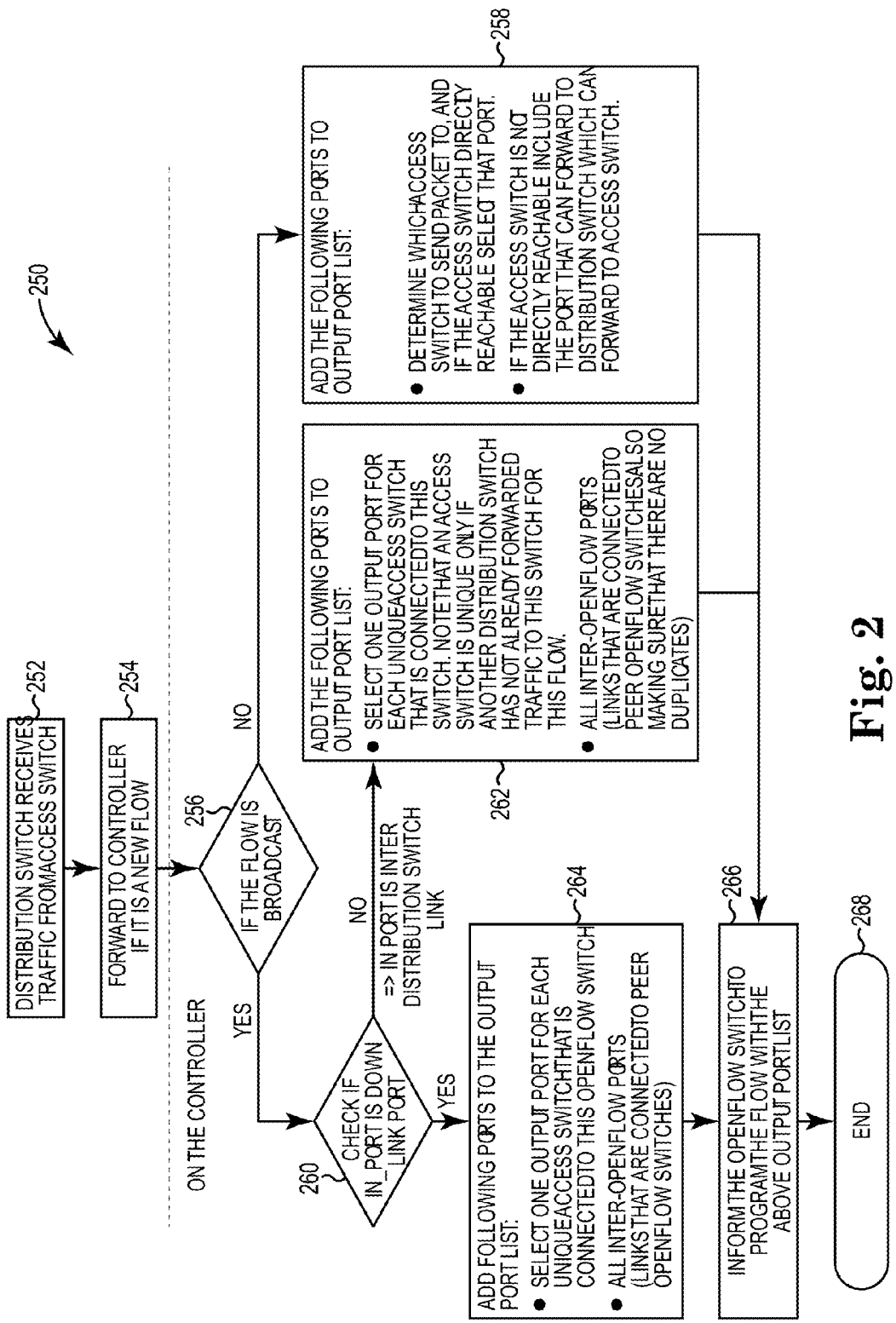
FIG. 2 illustrates a flow diagram for an example of a loop-free hybrid network process according to the present disclosure.

FIG. 2 illustrates a flow diagram for an example of a loop-free hybrid network process 250 according to the present disclosure. At box 252 a network device on the distribution layer (e.g., SDN network devices) can receive traffic from a network device on the access layer (e.g., non-software defined network device). As described herein the SDN network devices on the distribution layer can receive a single data unit from a non-software defined network device with aggregated ports.

At box 254 the data unit is forwarded to the network controller if there is not an existing forwarding rule for the data unit. For example, the data unit can include a header with a source address and/or a destination address. In this example, if the header information is not recognized by the receiving network device, the data unit can be sent to the network controller. The network controller can create a forwarding rule for the data unit and designate the forwarding rule to each of the SDN network devices.

At box 256 a determination is made on the network controller if the data unit is to be sent via broadcast (e.g., sent to all connected devices). If it is determined that the data unit is not going to be sent via broadcast, the process 250 can move to box 258. At box 258 a number of ports can be added to an output port list (e.g., table of ports to send a data unit out to a different network device). The output port list can be a number of ports that are capable of forwarding (e.g., sending) outgoing data units. The output port list can be determined based on which access switch the data packet is being sent to and/or if the access switch is directly or indirectly connected. If the access switch is not directly connected (e.g., connection with no intermediate network devices) the port that can forward to a distribution switch that can forward the data unit to the access switch. After box 258 the process can move to box 266. At box 266 the network manager (e.g., SDN controller) can program the distribution switch with the output port list.

If it is determined at box 256 that the data unit is going to be sent via broadcast, the process 250 can move to box 260.

At box 260 there can be a determination if the in port (e.g., receiving port) is a distribution down link port. A distribution down link port can be a port that is on a distribution switch directly connected to a port of an access switch.

If a determination is made at box 260 that the in port is not a distribution down link port then the process 250 can move to box 262. At box 262 a number of ports can be added to an output port list. As described herein, the output port list can be a number of ports that are capable of forwarding (e.g., sending) outgoing data units. The number of output port lists can be added based on whether the distribution switch has already forwarded data units to the received switch. The number of output port lists can be added based on whether or not the output ports are inter ports. Inter ports can be ports that connected to only distribution switches. After box 262 the process can move to box 266. At box 266 the network manager can program the distribution switch with the output port list.

If a determination is made at box 260 that the in port is a distribution down link port then the process 250 can move to box 264. At box 264 a number of ports can be added to an output port list. As described herein, the output port list can be a number of ports that are capable of forwarding (e.g., sending) outgoing data units. The number of output port lists can be added based on a unique access switch that is connected to the receiving switch. The number of output port lists can be added based on whether or not the output ports are inter ports. Inter ports can be ports that connected to only distribution switches. After box 264 the process can move to box 266.

After programming the receiving distribution switch with a particular output port list the process 250 can end at box 268.

Figure 3A:
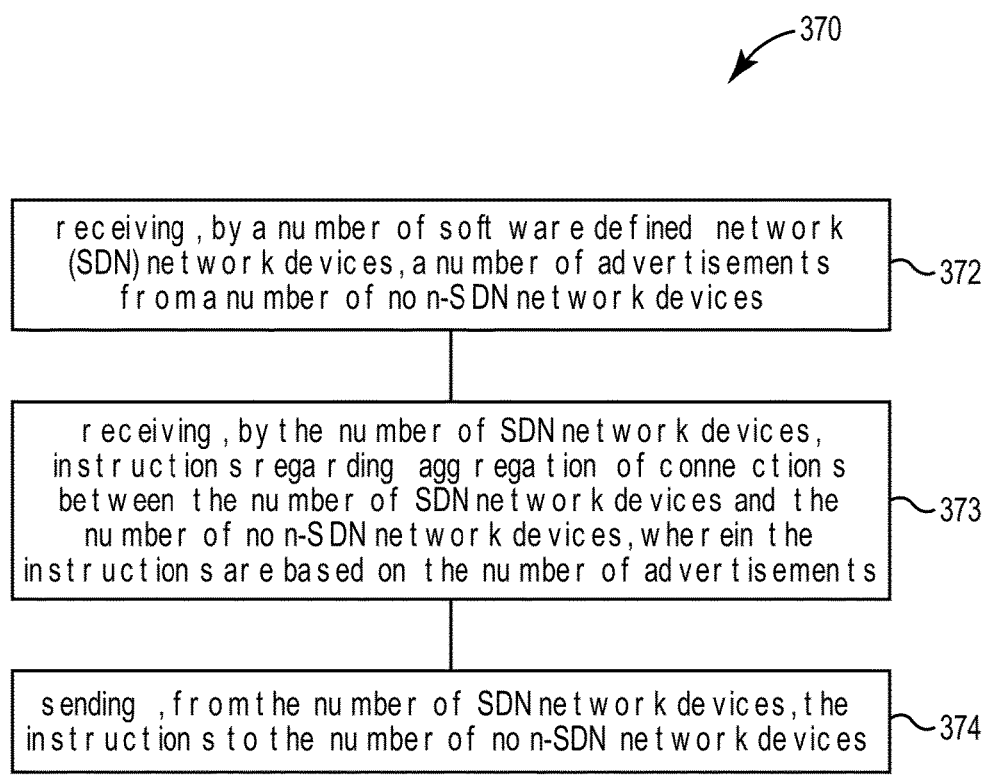
FIG. 3A illustrates a flow diagram for an example of a method for creating a loop-free hybrid network according to the present disclosure.

FIG. 3A illustrates a flow diagram for an example of a method 370 for creating a loop-free hybrid network according to the present disclosure. Creating the loop-free hybrid network can include utilizing a number of SDN network devices and non-SDN network devices. A loop-free hybrid network can include a network that can prevent data plane loops. Data plane loops can occur when a data unit is received by a sending network device. For example, a particular network device can send a particular packet to a number of different network devices. In this example, forwarding rules for the number of different network devices could send the data unit back to the particular network devices (e.g., sending network device) and thereby cause a data plane loop.

At box 372 the method 370 can include receiving, by a number of SDN network devices, a number of advertisements (e.g., a link layer discovery protocol) from a number of non-SDN network devices. The number of advertisements can include information relating to the port connections of the non-SDN network devices. For example, the advertisements can include a number of ports of the non-SDN network devices and what network devices (e.g., SDN network devices, computing devices, etc.) are communicatively connected to the number of ports.

The number of advertisements can be utilized by a computing device (e.g., network controller) to generate a network topology of the number of SDN network devices and the number of non-SDN network devices. The network topology can be utilized by a network controller connected to the number of SDN network devices. For example, the network controller can utilize the network topology to determine a number of forwarding rules for the network. Without the number of advertisements to provide information to the network controller it may not be possible for the network controller to communicate with the non-SDN network devices. For example, the network controller may not be able to determine the network topology of the number of non-SDN network devices. The network controller may not be able to communicate with the non-SDN network devices using the OpenFlow protocol. However, the network controller may be able to communicate via a simple network management protocol (SNMP) and configure a link aggregation for the number of non-SDN network devices.

At box 373 the method 370 can include receiving, by the number of SDN network devices, instructions regarding aggregation of connections between the number of SDN network devices and the number of non-SDN network devices, wherein the instructions are based on the number of advertisements. The instructions can include a number of ports and/or connections with the number of SDN network devices to aggregate.

The instructions can include an aggregation of all connections with the number of SDN network devices. That is, each of the number of non-SDN network devices can be connected to a number of SDN network devices and all of the connections to the number of SDN network devices can be aggregated.

The number of non-SDN network devices can be separated from other non-SDN network devices as described herein. That is, non-SDN network devices may not be connected to any other non-SDN network devices. For example, a particular non-SDN network device may have a total four ports. In this example, port 1 can be connected to a host. In this same example, port 2, port 3, and port 4 can be connected to individual SDN network devices and port 2, port 3, and port 4 can be aggregated.

At box 374 the method 370 can include sending, from the number of SDN network devices, the instructions to the number of non-SDN network devices. The number of non-SDN network devices can receive the instructions and aggregate a number of ports on the non-SDN network device based on the instructions. Aggregating the number of ports can be performed by the number of non-SDN network devices utilizing the instructions sent by the number of SDN network devices.

Figure 3B:
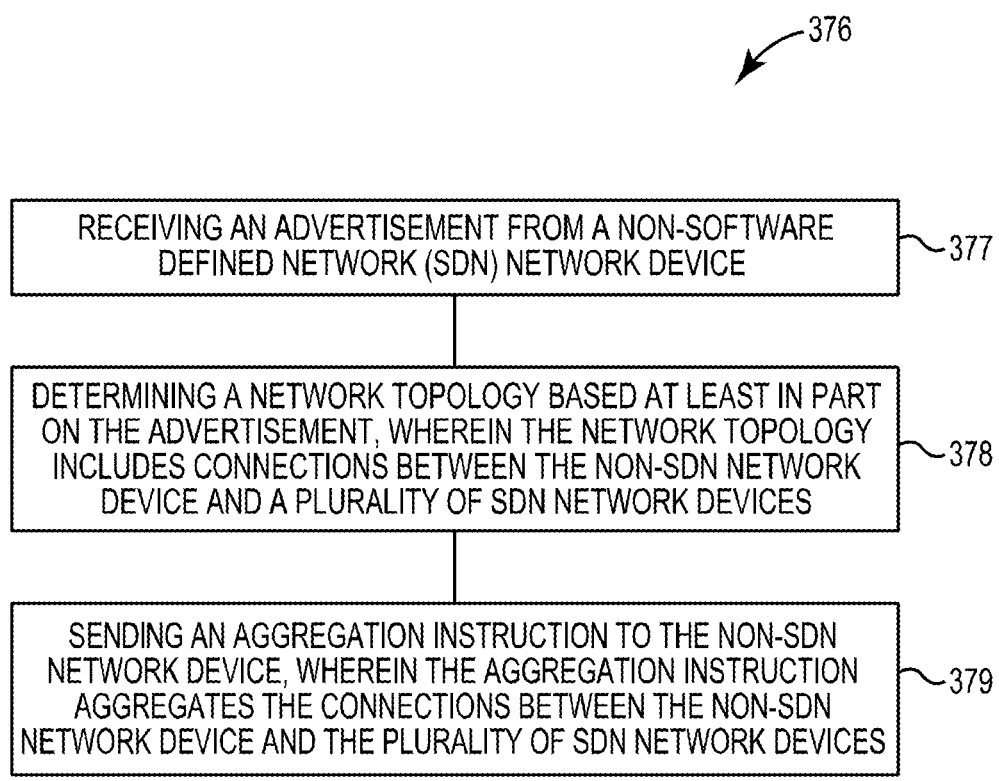
FIG. 3B illustrates a flow diagram for an example of a method for creating a loop-free hybrid network according to the present disclosure.

FIG. 3B illustrates a flow diagram for an example of a method 376 for creating a loop-free hybrid network according to the present disclosure. The method 376 can be utilized to create a loop-free hybrid network that includes SDN network devices and non-SDN network devices. The method 376 can eliminate loops between non-SDN network devices that are not able to receive forwarding rules via a forwarding protocol (e.g., OpenFlow, etc.) from the network controller.

At box 377 the method 376 can include receiving an advertisement from a non-software defined network (SDN) network device. Receiving the advertisement can include receiving information relating to the connections of the non-SDN network device with the plurality of SDN network devices. That is, the advertisement can include information relating to the non-SDN network device. The non-SDN network device can send the advertisement to one of the plurality of SDN network devices and the one of the plurality of SDN network devices can forward the advertisement to a network controller.

The advertisement can include information relating to devices that are connected to each port of the non-SDN network device. For example, the information can be that a first port of the non-SDN network device can be connected to a first of the plurality of SDN network devices. In this example, the information can also be that a second port of the non-SDN network device that is connected to a second of the plurality of SDN network devices. Furthermore, the information can be that a third port of the non-SDN network device that is connected to a host computing device. The information included within the advertisement can enable a device (e.g., network controller) to determine the network topology beyond the plurality of SDN network devices. That is, the information included within the advertisement can be used to determine the network topology of the non-SDN network device and the plurality of SDN network devices.

At box 378 the method 376 can include determining a network topology based at least in part on the advertisement, wherein the network topology includes connections between the non-SDN network device and a plurality of SDN network devices. Determining the network topology can include utilizing the advertisement sent from the non-SDN network device. As described herein, the advertisement can include information relating to a number of connections (e.g., ports) of the non-SDN network device.

At box 379 the method 376 can include sending an aggregation instruction to the non-SDN network device, wherein the aggregation instruction aggregates the connections between the non-SDN network device and the plurality of SDN network devices. As described herein, the network controller may not be able to communicate with the non-SDN network devices using the OpenFlow protocol, but the non-SDN network devices may be able to receive aggregation instructions via SNMP. The aggregation instruction can be sent, via a SNMP, to the non-SDN network and include a number of ports to aggregate. For example, the number of ports to aggregate can be ports that are connected to the plurality of SDN network devices. For example, if a first port and a second port of the non-SDN network device are each connected to a SDN network device, then the first port and the second port can be instructed to be aggregated by the aggregation instruction.

The aggregation instruction can be determined based on the network topology. For example, the network topology can include ports of the non-SDN network device that are connected to SDN network devices. In this example, the aggregation instruction can include instructions for the non-SDN network device to aggregate the ports connected to the SDN network devices.

Figure 4:
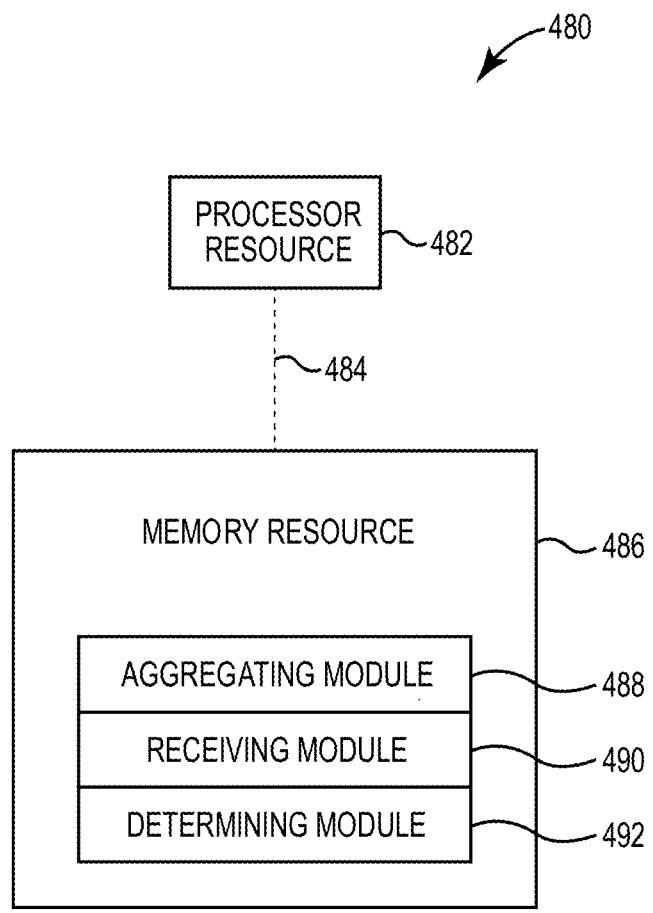
FIG. 4 illustrates a diagram of an example of a computing device according to the present disclosure.

FIG. 4 illustrates a diagram of an example of a computing device 480 according to the present disclosure. The computing device 480 can utilize software, hardware, firmware, and/or logic to perform a number of functions described herein.

The computing device 480 can be any combination of hardware and program instructions configured to share information. The hardware, for example can include a processing resource 482 and/or a memory resource 486 (e.g., computer-readable medium (CRM), machine readable medium (MRM), database, etc.) A processing resource 482, as used herein, can include any number of processors capable of executing instructions stored by a memory resource 486. Processing resource 482 may be integrated in a single device or distributed across multiple devices. The program instructions (e.g., computer-readable instructions (CRI)) can include instructions stored on the memory resource 486 and executable by the processing resource 482 to implement a desired function (e.g., generate a number of nodes based on the number of attributes, etc.).

The memory resource 486 can be in communication with a processing resource 482. A memory resource 486, as used herein, can include any number of memory components capable of storing instructions that can be executed by processing resource 482. Such memory resource 486 can be a non-transitory CRM. Memory resource 486 may be integrated in a single device or distributed across multiple devices. Further, memory resource 486 may be fully or partially integrated in the same device as processing resource 482 or it may be separate but accessible to that device and processing resource 482. Thus, it is noted that the system 340 may be implemented on a user and/or a participant device, on a server device and/or a collection of server devices, and/or on a combination of the user device and the server device and/or devices.

The processing resource 482 can be in communication with a memory resource 486 storing a set of CRI executable by the processing resource 482, as described herein. The CRI can also be stored in remote memory managed by a server and represent an installation package that can be downloaded, installed, and executed. Processing resource 482 can execute CRI that can be stored on an internal or external memory resource 486. The processing resource 482 can execute CRI to perform various functions, including the functions described with respect to FIGS. 1 and 2. For example, the processing resource 482 can execute CRI to determine a network topology of the SDN network devices and the non-SDN network devices based on the received number of advertisements.

The memory resource 486, as used herein, can include volatile and/or non-volatile memory. Volatile memory can include memory that depends upon power to store information, such as various types of dynamic random access memory (DRAM), among others. Non-volatile memory can include memory that does not depend upon power to store information. The memory resource 486 can be integral, or communicatively connected, to a computing device, in a wired and/or a wireless manner. For example, the memory resource 486 can be an internal memory, a portable memory, a portable disk, or a memory associated with another computing resource (e.g., enabling CRIs to be transferred and/or executed across a network such as the Internet).

The memory resource 486 can be in communication with the processing resource 482 via a communication link (e.g., path) 484. The communication link 484 can be local or remote to a machine (e.g., a computing device) associated with the processing resource 482. Examples of a local communication link 484 can include an electronic bus internal to a machine (e.g., a computing device) where the memory resource 486 is one of volatile, non-volatile, fixed, and/or removable storage medium in communication with the processing resource 482 via the electronic bus.

The communication link 484 can be such that the memory resource 486 is remote from the processing resource (e.g., 482), such as in a network connection between the memory resource 486 and the processing resource (e.g., 482). That is, the communication link 484 can be a network connection. Examples of such a network connection can include a local area network (LAN), wide area network (WAN), personal area network (PAN), and the Internet, among others. In such examples, the memory resource 486 can be associated with a first computing device and the processing resource 482 can be associated with a second computing device (e.g., a Java® server). For example, a processing resource 482 can be in communication with a memory resource 486, wherein the memory resource 486 includes a set of instructions and wherein the processing resource 482 is designed to carry out the set of instructions.

A number of modules 488, 490, 492 can include CRI that when executed by the processing resource 482 can perform a number of functions. The number of modules 488, 490, 492 can be sub-modules of other modules. For example, the aggregating module 488 and the determining module 492 can be sub-modules and/or contained within the same computing device. In another example, the number of modules 488, 490, 492 can comprise individual modules at separate and distinct locations (e.g., CRM, etc.).

An aggregating module 488 can include CRI that when executed by the processing resource 482 can aggregate ports of the number of non-SDN network devices that are utilized to communicate with a number of SDN network devices. Aggregating the ports of the number of non-SDN network devices can include aggregating all ports communicatively connected to SDN network devices. Aggregating the ports can eliminate a possibility of data units being received by a sending non-SDN network device. For example, if the ports of the non-SDN network devices are not aggregated, a non-software defined network device can send a data unit out of a first port and later receive the same data unit from a second port causing a data plane loop.

A receiving module 490 can include CRI that when executed by the processing resource 482 can receive a number advertisements from the number of SDN network devices. The number of advertisements can include information received from the number of non-SDN network devices. For example, the number of non-SDN network devices can send information (e.g., advertisements) to the number of SDN network devices. In this same example, the number of SDN network devices can relay the information from the number of non-SDN network devices to the network controller.

A determining module 492 can include CRI that when executed by the processing resource 482 can determine a network topology of the SDN network devices and the non-SDN network devices based on the received number of advertisements. The information sent to the network controller by the SDN network devices can enable the network controller to develop a network topology of both the SDN network devices and the non-SDN network devices.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method, comprising:
    receiving, by a network controller, an advertisement from a non-software defined network (SDN) network device;
    determining, by the network controller, a network topology based at least in part on the advertisement, wherein the network topology includes connections between the non-SDN network device and a plurality of SDN network devices;
    sending, by the network controller, an aggregation instruction to the non-SDN network device, wherein the aggregation instruction aggregates the connections between the non-SDN network device and the plurality of SDN network devices; and
    sending, by the network controller, forwarding rules to the plurality of SDN network devices, the forwarding rules determining how the plurality of SDN network devices route data units based on addresses in the data units.

2. The method of claim 1, wherein receiving the advertisement includes receiving information relating to the connections of the non-SDN network device with the plurality of SDN network devices.

3. The method of claim 1, wherein receiving the advertisement includes receiving information indicating:
    a first port of the non-SDN network device that is connected to a first of the plurality of SDN network devices; and
    a second port of the non-SDN network device that is connected to a second of the plurality of SDN network devices.

4. The method of claim 3, wherein the aggregation instruction aggregates the first port and the second port.

5. The method of claim 1, wherein receiving the advertisement includes receiving the advertisement from the non-SDN network device via one of the plurality of SDN network devices.

6. The method of claim 1, wherein the network controller is an SDN controller that performs the receiving, the determining, the sending of the aggregation instruction, and the sending of the forwarding rules.

7. The method of claim 1, wherein the non-SDN network device is not connected to any other non-SDN network device.

8. A non-transitory computer-readable medium storing instructions executable by a processor to cause a network controller to:
    receive an advertisement from a non-software defined network (SDN) network device via an SDN network device;
    determine a network topology that includes the SDN network device and the non-SDN network device based on the received advertisement;
    send, to the non-SDN network device, an aggregation instruction based on the determined network topology, the aggregation instruction specifying aggregation of a first port of the non-SDN network device that communicates with the SDN network device and a second port of the non-SDN network device that communicates with a different SDN network device; and
    send forwarding rules to the SDN network device and the different SDN network device, the forwarding rules determining how the SDN network device and the different SDN network device route data units based on addresses in the data units.

9. The non-transitory computer-readable medium of claim 8, wherein the advertisement includes information that describes ports of the non-SDN network device and devices connected to the ports.

10. The non-transitory computer-readable medium of claim 8, wherein the determining of the network topology uses a link layer discovery protocol.

11. The non-transitory computer-readable medium of claim 8, wherein the network controller is an SDN controller that performs the receiving, the determining, the sending of the aggregation instruction, and the sending of the forwarding rules.

12. The non-transitory computer-readable medium of claim 8, wherein the non-SDN network device is not connected to any other non-SDN network device.

13. A network controller, comprising:
a processing resource; and
instructions that are executable by the processing resource to:
- receive an advertisement from a non-software defined network (SDN) network device;
- receive a plurality of advertisements from a plurality of SDN network devices;
- determine a network topology of the non-SDN network device and the plurality of SDN network devices based on the advertisement and the plurality of advertisements;
- send an aggregation instruction to the non-SDN network device based on the network topology; and
- send a forwarding rule to one of the plurality of SDN network devices based on the network topology and the aggregation instruction.

14. The network controller of claim 13, wherein the network controller is an SDN controller that performs the receiving of the advertisement, the receiving of the plurality of advertisements, the determining, the sending of the aggregation instruction, and the sending of the forwarding rule.

15. The network controller of claim 13, wherein the instructions are executable by the processing resource to send instructions to a SDN network device of the plurality of SDN network devices to broadcast a received data unit to the non-SDN network device.

16. The network controller of claim 14, wherein the non-SDN network device is unable to recognize the forwarding rule sent by the SDN controller.

17. The network controller of claim 13, wherein the non-SDN network device is not connected to any other non-SDN network device.

18. The network controller of claim 13, wherein the sending of the aggregation instruction to the non-SDN network device comprises sending of the aggregation instruction to the non-SDN network device through at least one of the plurality of SDN network devices.

19. The network controller of claim 13, wherein the advertisement includes information of port connections of the non-SDN network device, and wherein the determining of the network topology is based on the advertisement including information of the port connections of the non-SDN network device.

20. The network controller of claim 19, wherein the advertisement further includes information of devices connected to ports of the non-SDN network device, and wherein the determining of the network topology is based on the advertisement including information of devices connected to ports of the non-SDN network device.

* * * * *